US008687582B2

(12) United States Patent
Qin et al.

(10) Patent No.: US 8,687,582 B2
(45) Date of Patent: Apr. 1, 2014

(54) METHOD AND DEVICE FOR TRANSMITTING SEMI-PERSISTENT SCHEDULING DATA

(75) Inventors: Zhongbin Qin, Warsaw (PL); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/401,382

(22) Filed: Feb. 21, 2012

(65) Prior Publication Data

US 2012/0147838 A1    Jun. 14, 2012

Related U.S. Application Data (63) Continuation of application No. PCT/CN2010/078603, filed on Nov. 10, 2010.

(30) Foreign Application Priority Data

Nov. 10, 2009    (CN) .......................... 2009 1 0210814

(51) Int. Cl.
    H04W 72/04    (2009.01)
(52) U.S. Cl.
    USPC ............................ 370/329; 370/312; 370/345
(58) Field of Classification Search
    USPC .................................................... 370/329
    See application file for complete search history.

(56) References Cited

U.S. PATENT DOCUMENTS

| 2004/0255220 | A1* | 12/2004 | Sudo .............................. 714/749 |
| 2006/0195767 | A1* | 8/2006 | Ihm et al. ....................... 714/776 |
| 2008/0117891 | A1* | 5/2008 | Damnjanovic et al. ....... 370/345 |
| 2009/0003282 | A1  | 1/2009 | Meylan et al. |
| 2009/0154417 | A1* | 6/2009 | Wu et al. ........................ 370/329 |
| 2009/0245153 | A1* | 10/2009 | Li et al. .......................... 370/312 |
| 2009/0245194 | A1* | 10/2009 | Damnjanovic et al. ....... 370/329 |
| 2010/0246521 | A1* | 9/2010 | Zhang et al. ................... 370/329 |
| 2010/0323709 | A1  | 12/2010 | Nam et al. |
| 2011/0107169 | A1* | 5/2011 | Lohr et al. ..................... 714/748 |

FOREIGN PATENT DOCUMENTS

| CN | 1946000 A | 4/2007 |
| CN | 101340419 A | 1/2009 |
| CN | 101478808 A | 7/2009 |

(Continued)

OTHER PUBLICATIONS

Office Action issued in corresponding Chinese Patent Application No. 200910210814.7, mailed Aug. 22, 2012.
Sheng et al., "Key Technologies in HSPA+ and Performance Improvements Evaluation" China Academic Journal Publishing House, Jul. 27, 2009.
Extended European Search Report issued in corresponding European Patent Application No. 10829530.4, mailed Sep. 19, 2012.
International Search Report and Written Opinion of the International Searching Authority issued in corresponding PCT Patent Application No. PCT/CN2010/078603, mailed Feb. 17, 2011.
Office Action issued in corresponding Japanese Patent Application No. 2012-525879, mailed May 28, 2013, 9 pages.
Jiang et al., "Principle and Performance of Semi-Persistent Scheduling for VoIP in LTE System" Wireless Communications, Networking and Mobile Computing, 2007. WiCom 2007, 4 pages.

Primary Examiner — Ian N Moore
Assistant Examiner — Lakeram Jangbahadur
(74) Attorney, Agent, or Firm — Brinks, Gilson & Lione (57) ABSTRACT

A method and device for transmitting semi-persistent scheduling (SPS) data reduces the probability of retransmitting a semi-persistent service, and increases the system throughput. The method includes: determining an initial transmission carrier for transmitting SPS data according to channel condition information of each carrier in multiple carriers and a gain of a match of a multi-user multiple-input and multiple-output (MU-MIMO) antenna unit; instructing, to a user, the determined initial transmission carrier for transmitting SPS data; and transmitting the SPS data to the user through the instructed initial transmission carrier for transmitting SPS data. The method and device are mainly applied to a process for transmitting SPS data in a carrier aggregation scenario.

14 Claims, 5 Drawing Sheets

(56) References Cited

FOREIGN PATENT DOCUMENTS

| | | |
|---|---|---|
| CN | 101488906 A | 7/2009 |
| CN | 101505498 A | 8/2009 |
| CN | 101541063 A | 9/2009 |
| EP | 2062402 A2 | 5/2009 |
| EP | 2112845 A1 | 10/2009 |
| JP | 2007181094 A | 7/2007 |
| JP | 2010527208 A | 8/2010 |
| JP | 2012531085 A | 12/2012 |
| WO | WO 2008133454 A1 | 11/2008 |
| WO | WO 2009022709 A1 | 2/2009 |
| WO | WO 2009098880 A1 | 8/2009 |

* cited by examiner

METHOD AND DEVICE FOR TRANSMITTING SEMI-PERSISTENT SCHEDULING DATA

CROSS-REFERENCE TO RELATED APPLICATIONS

This application is a continuation of International Application No. PCT/CN2010/078603, filed on Nov. 10, 2010, which claims priority to Chinese Patent Application No. 200910210814.7, filed on Nov. 10, 2009, both of which are hereby incorporated by reference in their entireties.

FIELD OF THE APPLICATION

The present application relates to the field of communications, and in particular, to a method and device for transmitting semi-persistent scheduling data.

BACKGROUND OF THE APPLICATION

Semi-persistent scheduling (SPS) is a scheduling mode of periodically pre-configuring a transmission resource. In the scheduling mode, a base station (eNodeB, eNB) activates and configures SPS resources used by a user equipment (UE) according to a service characteristic, and in a subsequent transmission process, the UE periodically uses pre-allocated resources for data transmission with no need for any scheduling instruction signaling. For example, in a long-term evolution (LTE) system, an eNB configures an SPS period of a Voice over Internet Protocol (VoIP) service through radio resource control (RRC) signaling, and specific SPS resources are activated, modified, and released through a physical downlink control channel (PDCCH) instruction.

In a conventional single-carrier system, for transmission of the SPS data, data transmission may only be performed periodically by using a fixed modulation and coding mode on a single carrier, and in the prior art, as carrier aggregation is introduced, dynamic nature of an SPS algorithm is suitably added. In the prior art, the following technical solutions are adopted: 1) every N pieces of SPS data are initially transmitted on different carriers in a hop and transformation mode; 2) when conflicts occur between initial transmission and retransmission, it is instructed through display signaling to perform the initial transmission on another carrier.

In the process of implementing the embodiments, it is found that the modes for transmitting SPS data in the prior art might cause a problem of relatively high probability of retransmitting the SPS data, and may not realize flexible matching of multiple users, which thereby influences the system throughput.

SUMMARY OF THE APPLICATION

The present application is directed to a method and device for transmitting SPS data, so as to effectively reduce the probability of retransmitting a semi-persistent service and increase the system throughput.

In order to achieve the above purpose, the embodiments disclosed below adopt technical solutions as follows:

An embodiment provides a method for transmitting SPS data, where the method includes:

determining an initial transmission carrier for transmitting SPS data according to channel condition information of each carrier in multiple carriers and a gain of a match of a multi-user multiple-input and multiple-output (MU-MIMO) antenna unit;

instructing, to a user, the determined initial transmission carrier for transmitting SPS data; and transmitting the SPS data to the user through the instructed initial transmission carrier for transmitting SPS data.

An embodiment provides a device for transmitting SPS data, where the device includes:

a determination unit, configured to determine an initial transmission carrier for transmitting SPS data according to channel condition information of each carrier in multiple carriers and a gain of a match of an MU-MIMO antenna unit;

an instruction unit, configured to instruct, to a user, the initial transmission carrier for transmitting SPS data determined by the determination unit; and a transmission unit, configured to transmit the semi-persistent data to the user through the initial transmission carrier for transmitting SPS data instructed by the instruction unit.

An embodiment provides a method for transmitting SPS data, where the method includes:

receiving, by a UE, an instruction transmitted by an eNB, in which the instruction is specifically used for instructing an initial transmission carrier for transmitting SPS data, and the initial transmission carrier is determined by the eNB according to channel condition information of each carrier in multiple carriers and a gain of a match of an MU-MIMO antenna unit; and receiving, by the UE, the SPS data from the eNB through the initial transmission carrier.

An embodiment provides a UE, where the UE includes:

a transceiver unit, configured to receive an instruction transmitted by an eNB; and a processing unit, configured to determine an initial transmission carrier for transmitting SPS data of the eNB according to the instruction received by the transceiver unit, and instruct the receiving unit to receive the SPS data from the eNB through the initial transmission carrier, in which the initial transmission carrier is determined by the eNB according to channel condition information of each carrier in multiple carriers and a gain of a match of an MU-MIMO antenna unit.

For the method and device for transmitting SPS data provided in the embodiments, an initial transmission carrier for transmitting SPS data is determined according to channel condition information of each carrier in multiple carriers and a gain of a match of an MU-MIMO antenna unit, the determined transmission carrier for transmitting SPS data is instructed to a user, and the semi-persistent data is transmitted to the user through the initial transmission carrier for transmitting SPS data instructed by the instruction unit. Compared with the prior art, in the technical solutions provided in the embodiments, an initial transmission carrier for transmitting SPS data of a user is determined according to channel condition information of each carrier in multiple carriers and a gain of a match of an MU-MIMO antenna unit, so as to effectively increase the accuracy of transmitting the SPS data, which thereby reduces the probability of retransmitting the SPS data, and increases the system throughput.

BRIEF DESCRIPTION OF THE DRAWINGS

To illustrate the technical solutions according to the embodiments or in the prior art more clearly, the accompanying drawings required for describing the embodiments or the prior art are introduced below briefly. Apparently, the accompanying drawings in the following descriptions merely show some of the embodiments, and persons skilled in the art may obtain other drawings according to the accompanying drawings without creative efforts.

DETAILED DESCRIPTION OF THE EMBODIMENTS

Various exemplary embodiments are described below with reference to the accompanying drawings. Persons skilled in the art may derive other embodiments from the embodiments given herein without making any creative efforts, and all such embodiments are covered in the protection scope of the claims.

Embodiment 1

Figure 1:
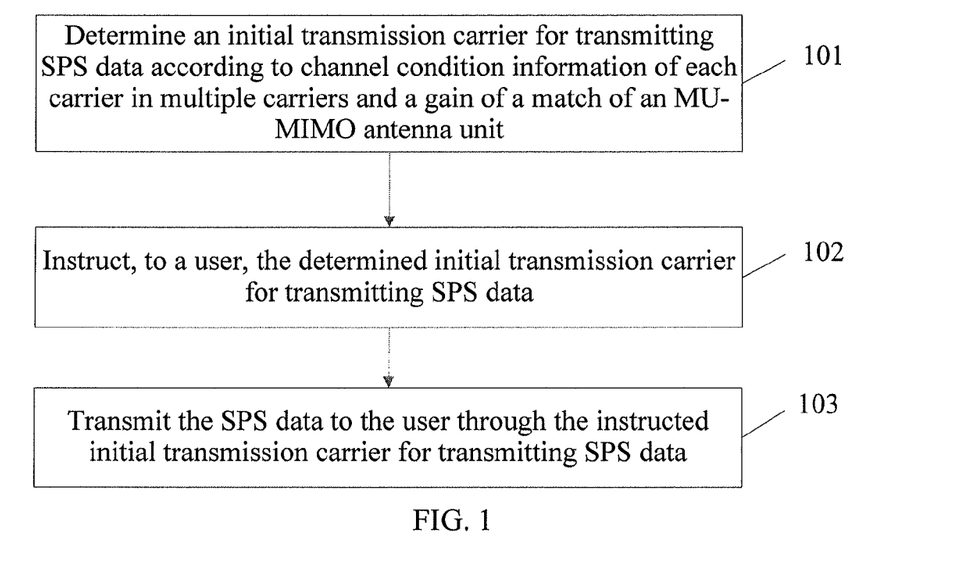
FIG. 1 is a flow chart of a method for transmitting SPS data according to Embodiment 1.

Embodiment 1 provides a method for transmitting SPS data, and as shown in FIG. 1, the method includes the following steps:

101: Determine an initial transmission carrier for transmitting SPS data according to channel condition information of each carrier in multiple carriers and a gain of a match of an MU-MIMO antenna unit.

The channel condition of the carrier is obtained through feedback by a data receiving end, and the channel condition information of the carrier includes three types: a channel quality indicator/channel state information (CQI/CSI), a rank indicator (RI), and a precoding matrix index (PMI). During MU-MIMO, according to the feedback information of the CQI/CSI, RI, and PMI, most suitable users are selected for matching through a certain algorithm, and a matching principle includes the following two aspects, which are specifically as follows: first, for a match between VoIP users, the principle is to satisfy a minimum overall retransmission probability; and second, for a match between a VoIP user and another non-VoIP user, the principle is to maximize the throughput of a time delay sensitive service on the premise of satisfying packet loss ratios of both the VoIP user and another non-VoIP user. After the match of the MU-MIMO antenna unit is determined according to the principle, the initial transmission carrier for transmitting SPS data is determined according to the gain of the selected match of the MU-MIMO antenna unit.

102: Instruct, to a user, the determined initial transmission carrier for transmitting SPS data, so that when the transmitted semi-persistent data is being received, only the carrier for transmitting data needs to be sensed to receive the transmitted semi-persistent data.

The instructing the determined initial transmission carrier for transmitting SPS data to the user may specifically include the following two modes: first, a physical layer channel is added on each carrier in the multiple carriers, and a 1-bit indicator bit is set in the physical layer channel, in which the 1-bit indicator bit is for instructing whether the SPS data is scheduled on the carrier for transmission; and second, one downlink main carrier is selected, a physical layer channel is added on the selected downlink main carrier, and an indicator bit having a predetermined length is set in the physical layer channel for instructing the initial transmission carrier for transmitting the SPS data.

103: Transmit the SPS data to the user through the instructed initial transmission carrier for transmitting SPS data.

Figure 2:
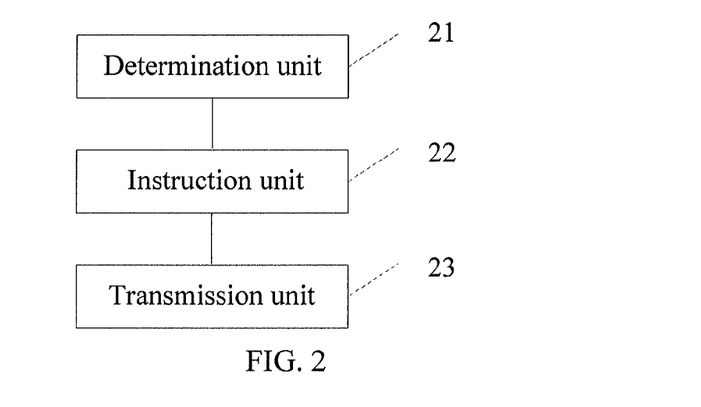
FIG. 2 is a composition block diagram of a device for transmitting SPS data according to Embodiment 1.

Embodiment 1 provides a device for transmitting SPS data, and as shown in FIG. 2, the device includes a determination unit 21, an instruction unit 22, and a transmission unit 23.

The determination unit 21 is configured to determine an initial transmission carrier for transmitting SPS data according to channel condition information of each carrier in multiple carriers and a gain of a match of an MU-MIMO antenna unit. After the initial transmission carrier for transmitting the SPS data is determined, the instruction unit 22 is configured to instruct, to a user, the initial transmission carrier for transmitting SPS data determined by the determination unit 21. The transmission unit 23 is configured to transmit the semi-persistent data to the user through the initial transmission carrier for transmitting SPS data instructed by the instruction unit 22.

The channel condition of the carrier is fed back by the data receiving end, and the channel condition information of the carrier includes three types: a CQI/CSI, an RI, and a PMI. During MU-MIMO, according to the feedback information of the CQI/CSI, RI, and PMI, most suitable users are selected for matching through a certain algorithm, and the matching principle includes the following two aspects, which are specifically as follows: first, for a match between VoIP users, the principle is to satisfy a minimum overall retransmission probability; and second, for a match between a VoIP user and another non-VoIP user, the principle is to maximize the throughput of the time delay sensitive service on the premise of satisfying packet loss ratios of both the VoIP user and another non-VoIP user. After the match of the MU-MIMO antenna unit is determined according to the principle, the initial transmission carrier for transmitting SPS data is determined according to the gain of the selected match of the MU-MIMO antenna unit.

The instruction unit 22 may instruct, to the user, the initial transmission carrier for transmitting SPS data determined by the determination unit 21 specifically in the following two modes: first, a physical layer channel is added on each carrier in the multiple carriers, and a 1-bit indicator bit is set in the physical layer channel, in which the 1-bit indicator bit is for instructing whether the SPS data is scheduled on the carrier for transmission; second, one downlink main carrier is selected, a physical layer channel is added on the selected downlink main carrier, and an indicator bit having a predetermined length is set in the physical layer channel for instructing the initial transmission carrier for transmitting the SPS data.

In the embodiment, an initial transmission carrier for transmitting SPS data is determined according to channel condition information of each carrier in multiple carriers and a gain of a match of an MU-MIMO antenna unit, the determined transmission carrier for transmitting SPS data is instructed to a user, and the semi-persistent data is transmitted to the user through the initial transmission carrier for transmitting SPS data instructed by the instruction unit. Compared with the prior art, in the technical solution provided in the embodiment, an initial transmission carrier for transmitting SPS data of a user is determined according to channel condition information of each carrier in multiple carriers and a gain of a match of an MU-MIMO antenna unit, so as to effectively increase the accuracy of transmitting the SPS data, which thereby reduces the probability of retransmitting the SPS data, and increases the system throughput.

Embodiment 2

Figure 3:
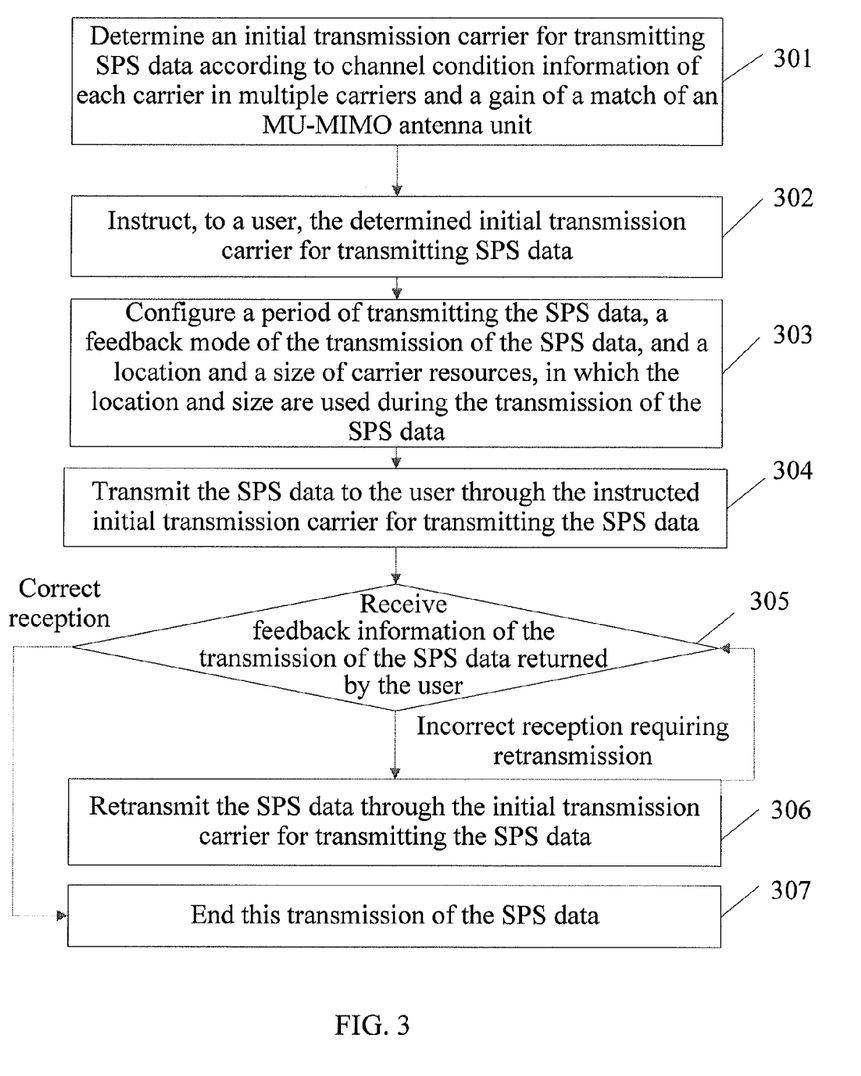
FIG. 3 is a flow chart of a method for transmitting SPS data according to Embodiment 2.

Embodiment 2 provides a method for transmitting SPS data, and as shown in FIG. 3, the method includes the following steps:

301: Determine an initial transmission carrier for transmitting SPS data according to channel condition information of each carrier in multiple carriers and a gain of a match of an MU-MIMO antenna unit.

The channel condition of the carrier is fed back by a data receiving end, and the channel condition information of the carrier includes three types: a CQI/CSI, an RI, and a PMI. During MU-MIMO, according to the feedback information of the CQI/CSI, RI, and PMI, most suitable users are selected for matching through a certain algorithm, and the matching principle includes the following two aspects, which are specifically as follows: first, for a match between VoIP users, the principle is to satisfy a minimum overall retransmission probability; and second, for a match between a VoIP user and another non-VoIP user, the principle is to maximize the throughput of the time delay sensitive service on the premise of satisfying packet loss ratios of both the VoIP user and another non-VoIP user. After the match of the MU-MIMO antenna unit is determined according to the principle, the initial transmission carrier for transmitting SPS data is determined according to the gain of the selected match of the MU-MIMO antenna unit.

302: Instructed, to a user, the determined initial transmission carrier for transmitting SPS data, so that when the transmitted semi-persistent data is being received, only the carrier for transmitting data needs to be sensed to receive the transmitted semi-persistent data.

The instructing the determined initial transmission carrier for transmitting SPS data to the user may specifically include the following two modes:

First, a physical layer channel is added on each carrier in the multiple carriers, and a 1-bit indicator bit is set in the physical layer channel, in which the 1-bit indicator bit is for instructing whether the SPS data is scheduled on the carrier for transmission. For example, when the 1-bit indicator bit is set to 1, it indicates that the SPS data of the UE is scheduled on the carrier for transmission, and when the 1-bit indicator bit is set to 0, it indicates that the SPS data of the UE is not scheduled on the carrier for transmission; and vice versa, but the present invention is not limited thereto.

Second, one downlink main carrier is selected, a physical layer channel is added on the selected downlink main carrier, an indicator bit having a predetermined length is set in the physical layer channel for instructing the initial transmission carrier for transmitting the SPS data, and the indicator bit having the predetermined length may be set according to a practical requirement, for example, 2 bits to 3 bits.

303: Configure a period of the transmission of the SPS data, a feedback mode of the transmission of the SPS data, and a location and a size of carrier resources, in which the location and size are used during the transmission of the SPS data. The configuration of each parameter may be realized by using dedicated signaling, and the dedicated signaling may be, but not limited to, RRC signaling.

The period of transmitting the SPS data may be specifically set according to a practical requirement, for example, 20 milliseconds.

The feedback modes of the transmission of the SPS data specifically include two types, which are specifically illustrated with reference to FIG. 4 and FIG. 5.

Figure 4:
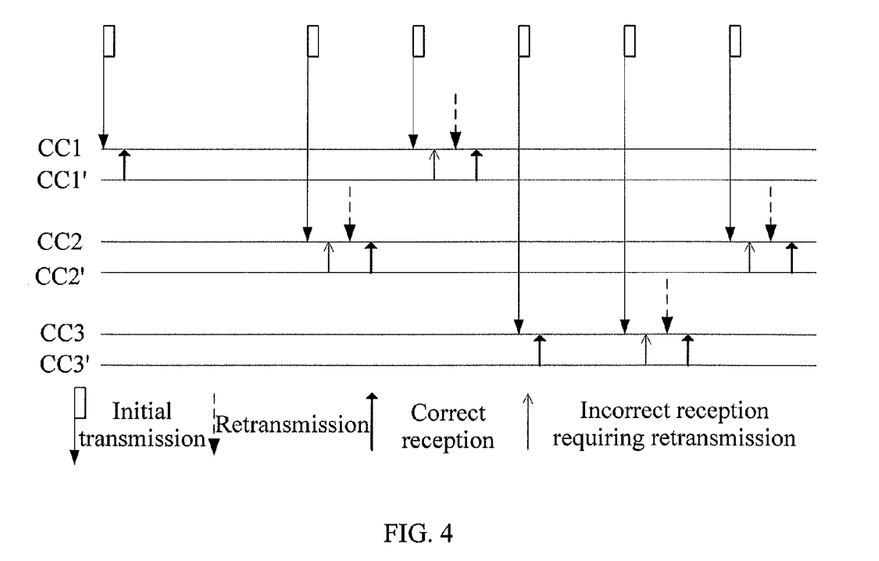
FIG. 4 is a schematic diagram of a feedback mode of SPS data in a method for transmitting SPS data according to Embodiment 2.

First, as shown in FIG. 4, the feedback mode of the transmission of the SPS data is specifically as follows. Feedback information of initial transmission and retransmission of the SPS data is transmitted through a carrier matching the carrier for transmitting the SPS data. The feedback information includes acknowledgement (ACK)/negative acknowledgement (NACK). The ACK indicates correct reception, and a transmission end does not require retransmission. The NACK indicates incorrect reception, and the transmission end requires retransmission. Hereinafter, the ACK/NACK is abbreviated as A/N. CC1 and CC1', CC2 and CC2', and CC3 and CC3' are mutually matching pairs transmission channels, and when the CC1 is used for transmitting the SPS data, the UE may perform analysis on a corresponding matching transmission channel CC1', to acquire feedback information transmitted by a corresponding receiving end receiving the SPS data, and there is no need for performing specific setting of the carrier for the feedback information on a transmission protocol. The information feedback mode is suitable for uplink SPS service transmission. For example, in an LTE system, as a one-to-one corresponding relation exists between an uplink data transmission channel (physical uplink shared channels, PUSCH) and a downlink feedback channel (physical hybrid automatic repeat-request (HARQ) indicator channel (PHICH)) of the feedback information in the LTE system, during the uplink SPS service transmission, the UE knows on which downlink carrier PHICH decoding should be performed, so as to determine the feedback information of the data transmission with no need to change a protocol.

Figure 5:
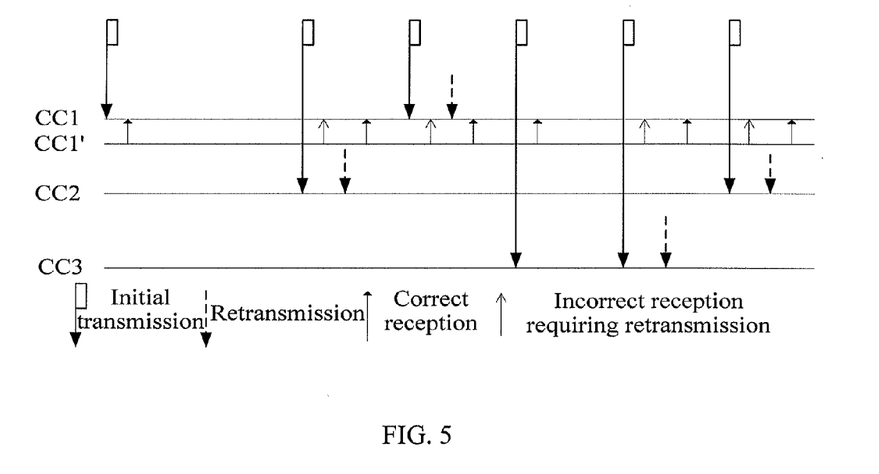
FIG. 5 is a schematic diagram of a feedback mode of another persistent scheduling service in a method for transmitting SPS data according to Embodiment 2.

Second, as shown in FIG. 5, the feedback mode of the transmission of the SPS data is specifically as follows. One main feedback carrier is selected, and feedback information of the initial transmission and retransmission of all SPS data are transmitted through the selected main feedback carrier. The CC1' is the selected main feedback carrier, feedback information of initial transmission and retransmission of the CC1, CC2, and CC3 is fed back by the selected main feedback carrier CC1'. For downlink transmission, due to asymmetric carrier aggregation, that is, one uplink is corresponding to multiple downlinks, the feedback mode of the SPS data is suitable for enhanced feedback of the downlink transmission, and feedback resources of the physical uplink control channel (PUCCH) on the main carrier may be pre-allocated to the UE that performs downlink SPS service transmission, and conflict avoidance needs to be effectively performed on physical downlink shared channel (PDSCH) transmission of the CC1 and the A/N feedback of the SPS service transmission of the CC2 and CC3.

Furthermore, if the first feedback mode is adopted to transmit downlink SPS data, the A/N resource configuration needs to be performed on the A/N on each carrier through the RRC dedicated signaling according to the period of transmitting the SPS data and corresponding pre-allocated resources. When some pre-allocated PUCCH resources are not being used, they may be used for other purposes.

304: Transmit the SPS data to the user through the instructed initial transmission carrier for transmitting the SPS data.

305: Receive feedback information of the transmission of the SPS data returned by the user, and the feedback information includes correct reception or incorrect reception requiring retransmission. If the received feedback information is correct reception, step 307 is performed. If the received feedback information is incorrect reception requiring retransmission, step 306 is performed. It should be noted that, step 307 and step 306 may be performed asynchronously, that is, when step 306 is performed, step 307 may not be performed, and when step 307 is performed, step 306 may not be performed.

306: Retransmit the SPS data through the initial transmission carrier for transmitting the SPS data, so that the receiving end may correctly receive the SPS data transmitted by the transmission end; and after the SPS data is retransmitted through the initial transmission carrier, step 305 is performed, so as to determine that the receiving end correctly receives the SPS data.

07: End this transmission of the SPS data.

Figure 6:
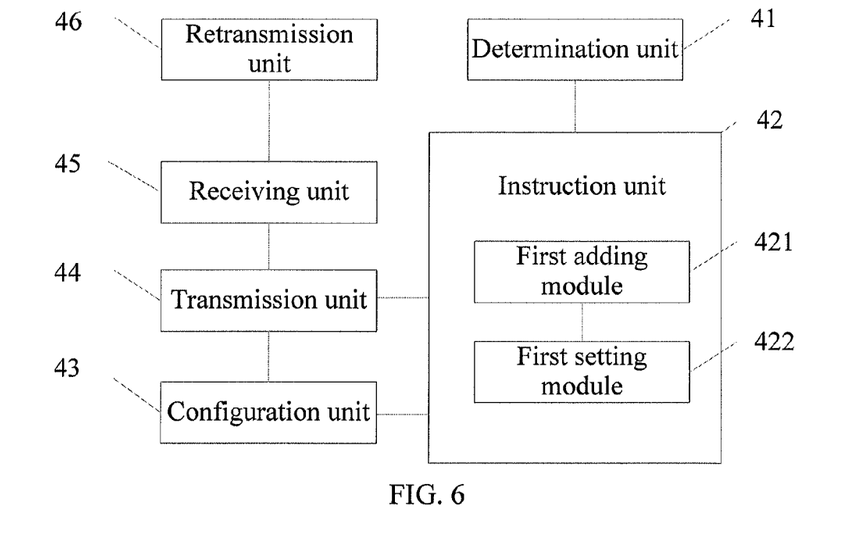
FIG. 6 is a composition block diagram of a device for transmitting SPS data according to Embodiment 2.

Embodiment 2 provides a device for transmitting SPS data, and as shown in FIG. 6, the device includes a determination unit 41, an instruction unit 42, a configuration unit 43, a transmission unit 44, a receiving unit 45, and a retransmission unit 46.

The determination unit 41 is configured to determine an initial transmission carrier for transmitting SPS data according to channel condition information of each carrier in multiple carriers and a gain of a match of an MU-MIMO antenna unit. The channel condition of the carrier is fed back by a data receiving end, and the channel condition information of the carrier includes three types: a CQI/CSI, an RI, and a PMI. During MU-MIMO, according to the feedback information of the CQI/CSI, RI, and PMI, most suitable users are selected for matching through a certain algorithm, and the matching principle includes the following two aspects, which are specifically as follows: first, for a match between VoIP users, the principle is to satisfy a minimum overall retransmission probability; and second, for a match between a VoIP user and another non-VoIP user, the principle is to maximize the throughput of the time delay sensitive service on the premise of satisfying packet loss ratios of both the VoIP user and another non-VoIP user. After the match of the MU-MIMO antenna unit is determined according to the principle, the initial transmission carrier for transmitting SPS data is determined according to the gain of the selected match of the MU-MIMO antenna unit.

After the initial transmission carrier for transmitting SPS data is determined, the instruction unit 42 is configured to instruct, to a user, the initial transmission carrier for transmitting SPS data determined by the determination unit 41. The configuration unit 43 is configured to configure a period of transmitting the SPS data, a feedback mode of the transmission of the SPS data, and a location and a size of carrier resources, in which the location and size are used during the transmission of the SPS data. The transmission unit 44 is configured to transmit the semi-persistent data to the user through the initial transmission carrier for transmitting SPS data instructed by the instruction unit 42 according to a parameter of the transmission of the SPS data configured by the configuration unit 43. The SPS data feedback mode includes: transmitting the feedback information of the initial transmission and retransmission of the SPS data through a carrier matching the carrier for transmitting the SPS data; or selecting one main feedback carrier and transmitting the feedback information of the initial transmission and retransmission of all SPS data through the main feedback carrier.

After the transmission unit 44 transmits the semi-persistent data to the user through the initial transmission carrier for transmitting SPS data instructed by the instruction unit 42, the receiving unit 45 is configured to receive feedback information of the transmission of the SPS data returned by the user, and the feedback information includes correct reception or incorrect reception requiring retransmission. When the feedback information of the transmission of the SPS data returned by the user and received by the receiving unit 45 is incorrect reception requiring retransmission, the retransmission unit 46 is configured to retransmit the SPS data through the initial transmission carrier for transmitting the SPS data of the transmission unit 44, so that the receiving end may correctly receive the transmitted SPS data.

The instruction unit 42 includes a first adding module 421 and a first setting module 422.

When the instruction unit 42 instructs, to the user, the initial transmission carrier for transmitting SPS data determined by the determination unit 41, at first the first adding module 421 adds a physical layer channel on each carrier in the multiple carriers, and after the physical layer channel is added on each carrier in the multiple carriers, the first setting module 422 is configured to set a 1-bit indicator bit in the physical layer channel added by the adding module 421, in which the 1-bit indicator bit is for instructing whether the SPS data is scheduled on the carrier for transmission.

Figure 7:
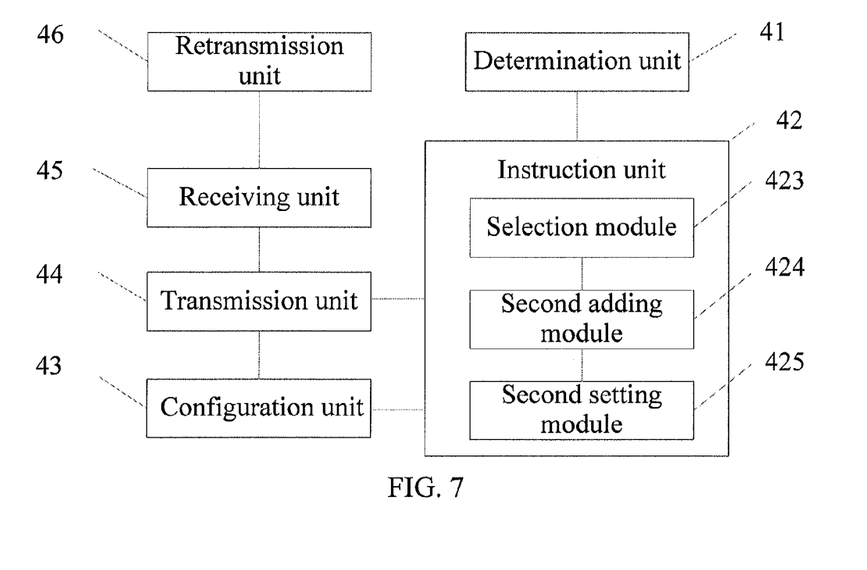
FIG. 7 is a composition block diagram of a device for transmitting SPS data according to Embodiment 2.

In addition to the above implementation method, the instructing, to the user, the initial transmission carrier for transmitting SPS data determined by the determination unit 41 may also adopt the method in the following embodiment as shown in FIG. 7. The instruction unit 42 includes a selection module 423, a second adding module 424, and a second setting module 425.

When the instruction unit 42 instructs, to the user, the initial transmission carrier for transmitting SPS data determined by the determination unit 41, at first the selection module 423 selects one downlink main carrier, and after the downlink main carrier is selected, the second adding module 424 is configured to add a physical layer channel on the downlink main carrier selected by the selection module 423, and the second setting module 425 is configured to set, in the physical layer channel added by the second adding module 424, an indicator bit of a predetermined length for instructing the initial transmission carrier for transmitting the SPS data.

In the embodiment, an initial transmission carrier for transmitting SPS data is determined according to channel condition information of each carrier in multiple carriers and a gain of a match of an MU-MIMO antenna unit, the determined transmission carrier for transmitting SPS data is instructed to a user, and the semi-persistent data is transmitted to the user through the initial transmission carrier for transmitting SPS data instructed by the instruction unit. Compared with the prior art, in the technical solution provided in the embodiment, an initial transmission carrier for transmitting SPS data of a user is determined according to channel condition information of each carrier in multiple carriers and a gain of a match of an MU-MIMO antenna unit, so as to effectively increase the accuracy of transmitting the SPS data, which thereby reduces the probability of retransmitting the SPS data, and increases the system throughput.

Also, in the embodiment, when the received feedback information fed back by the receiving end is incorrect reception requiring retransmission, the SPS data is retransmitted through the carrier that initially transmits the SPS data, so that the initial transmission and retransmission of the same SPS data are performed on one carrier. In addition, as initial transmission of different SPS data may be performed on different carriers, a conflict between initial transmission and retransmission of a service is avoided.

Embodiment 3

Figure 8:
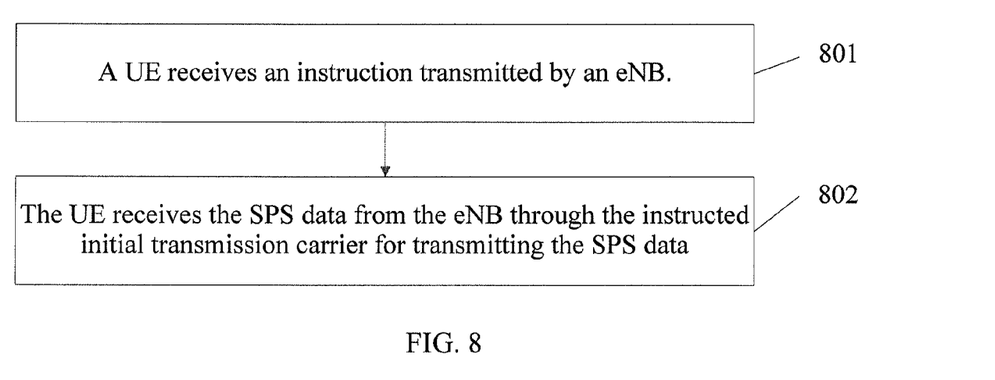
FIG. 8 is a flow chart of a method for transmitting SPS data according to Embodiment 3.

Embodiment 3 further provides a method for transmitting SPS data, in which the method is corresponding to the method at an eNB side provided in Embodiment 1, and in which the method may realize an interaction process between a UE and an eNB in Embodiment 1. As shown in FIG. 8, the method includes the following steps:

801: A UE receives an instruction transmitted by an eNB. The instruction is specifically used for instructing an initial transmission carrier for transmitting SPS data, and the initial transmission carrier for transmitting SPS data is determined by the eNB according to channel condition information of each carrier in multiple carriers and a gain of a match of an MU-MIMO antenna unit.

The instruction transmitted by the eNB may be: a 1-bit indicator bit set by the eNB in a physical layer channel on each carrier in the multiple carriers, in which the 1-bit indicator bit is for instructing whether the SPS data is scheduled on the carrier for transmission; or an indicator bit having a predetermined length set by the eNB in a physical layer channel added on a selected downlink main carrier, for instructing the initial transmission carrier for transmitting the SPS data.

1802: The UE receives the SPS data from the eNB through the initial transmission carrier.

After step 802, the method may further include returning feedback information of the transmission of the SPS data to the eNB, and the feedback information includes correct reception or incorrect reception requiring retransmission. When the feedback information is incorrect reception requiring retransmission, the method may further include receiving the SPS data retransmitted by the eNB through the initial transmission carrier.

Figure 9:
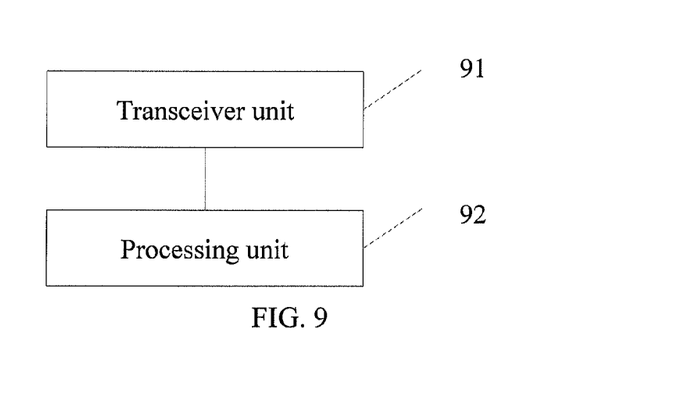
FIG. 9 is a composition block diagram of a UE according to Embodiment 3.

Embodiment 3 further provides a UE, which may realize the method at a UE side. As shown in FIG. 9, the UE includes a transceiver unit 91 and a processing unit 92.

The transceiver unit 91 is configured to receive an instruction transmitted by an eNB.

The processing unit 92 is configured to determine an initial transmission carrier for transmitting SPS data of the eNB according to the instruction received by the transceiver unit 91, and instruct the receiving unit 91 to receive the SPS data from the eNB through the initial transmission carrier. The initial transmission carrier for transmitting SPS data is determined by the eNB according to channel condition information of each carrier in multiple carriers and a gain of a match of an MU-MIMO antenna unit.

After the transceiver unit 91 receives the SPS data from the eNB through the initial transmission carrier, the transceiver unit 91 may be further configured to return feedback information of the transmission of the SPS data to the eNB, and the feedback information includes correct reception or incorrect reception requiring retransmission. If the feedback information of the transceiver unit 91 is incorrect reception requiring retransmission, the transceiver unit 91 may be further configured to receive the SPS data retransmitted by the eNB through the initial transmission carrier.

In the technical solution provided in this embodiment, an initial transmission carrier for transmitting SPS data of a user is determined by an eNB according to channel condition information of each carrier in multiple carriers and a gain of a match of an MU-MIMO antenna unit, so as to effectively increase the accuracy of transmitting the SPS data, which thereby reduces the probability of retransmitting the SPS data, and increases the system throughput.

Through the above description of the embodiments, it is apparent to persons skilled in the art that the embodiments be implemented by software on necessary universal hardware, and may also be accomplished by hardware, but in most cases, the embodiments are preferably implemented through the former method. Based on this understanding, the embodiments described above may be implemented in the form of a software product. The computer software product may be stored in a readable storage medium, for example, a floppy disk, hard disk, or optical disk of the computer, and contain several instructions for instructing a computer equipment (for example, a personal computer, a server, or a network equipment) to perform the method according to the embodiments.

In conclusion, the above are merely exemplary embodiments. However, the protection scope claims is not limited to the above embodiments. Changes or replacements by persons skilled in the art to the disclosed embodiments are considered to fall within the protection scope of the claims.

What is claimed is:

1. A method for transmitting semi-persistent scheduling data, comprising:
    determining an initial transmission carrier for transmitting semi-persistent scheduling data according to channel condition information of each carrier in multiple carriers and a gain of a match of a multi-user multiple-input and multiple-output antenna unit, wherein the determining of the initial transmission carrier comprises:
        selecting a match of the multi-user multiple-input and multiple-output antenna unit according to a rank indicator, a precoding matrix index, a channel quality indicator or channel state information that are of each carrier in the multiple carriers; and
        determining the initial transmission carrier according to a gain of the selected match of the multi-user multiple-input and multiple-output antenna unit;
    instructing a user equipment (UE) to use the determined initial transmission carrier for a subsequent transmission of scheduling data by the UE, wherein the instructing of the UE to use the determined initial transmission carrier for receiving the semi-persistent scheduling data to be transmitted comprises:
        adding a physical layer channel on each carrier in the multiple carriers, and setting a 1-bit indicator bit in the physical layer channel, wherein the 1-bit indicator bit is for instructing whether the semi-persistent scheduling data is scheduled on the carrier for transmission;
        or, selecting one downlink main carrier, adding a physical layer channel on the selected downlink main carrier, and setting, in the physical layer channel, an indicator bit of a predetermined length for instructing the initial transmission carrier; and
    transmitting the semi-persistent scheduling data to the UE through the instructed initial transmission carrier to initiate the transmission of the uplink scheduling data by the UE through the instructed initial transmission.

2. The transmission method according to claim 1, wherein before transmitting the semi-persistent scheduling data to the UE through the instructed initial transmission carrier, the method further comprises:
    configuring a feedback mode of transmitting semi-persistent scheduling data;
    wherein the feedback mode of transmitting semi-persistent scheduling data comprises:
    transmitting feedback information of initial transmission and retransmitting the semi-persistent scheduling data through a carrier matching another carrier; or selecting a main feedback carrier, and transmitting the feedback information of the initial transmission and retransmitting all semi-persistent scheduling data through the selected main feedback carrier.

3. The transmission method according to claim 1, wherein after transmitting the semi-persistent scheduling data to the UE through the instructed initial transmission carrier, the method further comprises:
receiving feedback information of the transmission of the semi-persistent scheduling data from the UE, wherein the feedback information indicates a correct reception or an incorrect reception requiring retransmission.

4. The transmission method according to claim 3, wherein when the feedback information indicates incorrect reception requiring retransmission, the method further comprises:
retransmitting the semi-persistent scheduling data through the initial transmission carrier.

5. A device for transmitting semi-persistent scheduling data, comprising:
a determination unit configured to determine an initial transmission carrier for transmitting semi-persistent scheduling data according to channel condition information of each carrier in multiple carriers and a gain of a match of a multi-user multiple-input and multiple-output antenna unit;
an instruction unit configured to instruct a UE to use the determined initial transmission carrier for a subsequent transmission of uplink scheduling data by the UE, wherein the instruction unit comprises:
a first adding module configured to add a physical layer channel on each carrier in the multiple carriers; and
a first setting module configured to set a 1-bit indicator bit in the physical layer channel added by the adding module, wherein the 1-bit indicator bit is for instructing whether the semi-persistent scheduling data is scheduled on the carrier for transmission; and
a transmission unit, configured to transmit the semi-persistent data to the UE through the initial transmission carrier to initiate the transmission of the uplink scheduling data by the UE through the instructed initial transmission carrier, wherein the instruction unit comprises:
a selection module configured to select one downlink main carrier;
a second adding module configured to add a physical layer channel on the downlink main carrier selected by the selection module; and
a second setting module configured to set, in the physical layer channel added by the second adding module, an indicator bit of a predetermined length for instructing the initial transmission carrier for transmitting the semi-persistent scheduling data.

6. The device according to claim 5, further comprising:
a configuration unit configured to configure a period of transmitting the semi-persistent scheduling data, a feedback mode of the transmission of the semi-persistent scheduling data, and a location and a size of carrier resources, wherein the location and size are used during the transmission of the semi-persistent scheduling data, before the transmission unit transmits the semi-persistent scheduling data to the user through the initial transmission carrier.

7. The transmission device according to claim 5, further comprising:
a receiving unit configured to receive feedback information of the transmission of the semi-persistent scheduling data returned by the UE after the transmission unit transmits the semi-persistent scheduling data to the UE through the initial transmission carrier for transmitting semi-persistent scheduling data instructed by the instruction unit, wherein the feedback information comprises correct reception or incorrect reception requiring retransmission.

8. The device according to claim 7, further comprising:
a retransmission unit configured to retransmit the semi-persistent scheduling data through the initial transmission carrier for transmitting the semi-persistent scheduling data of the transmission unit when the feedback information received by the receiving unit is incorrect reception requiring retransmission.

9. A method for transmitting semi-persistent scheduling data, comprising:
receiving, by a user equipment (UE), an instruction from a base station that indicates an initial transmission carrier for transmitting semi-persistent scheduling data, and the initial transmission carrier is determined by the base station according to channel condition information of each carrier in multiple carriers and a gain of a match of a multi-user multiple-input and multiple-output antenna unit, wherein the initial transmission carrier is determined by:
selecting a match of the multi-user multiple-input and multiple-output antenna unit according to a rank indicator, a precodinq matrix index, a channel quality indicator or channel state information that are of each carrier in the multiple carriers; and
determining the initial transmission carrier according to a gain of the selected match of the multi-user multiple-input and multiple-output antenna unit; and
receiving, by the user equipment, the semi-persistent scheduling data from the base station through the initial transmission carrier to initiate a subsequent transmission of uplink scheduling data by the UE through the initial transmission carrier, wherein the instruction from the base station indicates that either:
a 1-bit indicator bit in a physical layer channel on each carrier in the multiple carriers is set, wherein the indicator bit instructs whether the semi-persistent scheduling data is scheduled on the carrier for transmission; or
an indicator bit in a physical layer channel added on a selected downlink main carrier that has a predetermined length is set, wherein the indicator bit instructs the initial transmission carrier for transmitting the semi-persistent scheduling data.

10. The method according to claim 9, wherein after receiving the semi-persistent scheduling data from the base station through the initial transmission carrier, the method further comprises:
returning feedback information of the transmission of the semi-persistent scheduling data to the base station, wherein the feedback information indicates a correct reception or an incorrect reception requiring retransmission.

11. The method according to claim 10, wherein when the feedback information indicates an incorrect reception requiring retransmission, the method further comprises:
receiving, by the user equipment, the semi-persistent scheduling data retransmitted by the base station through the initial transmission carrier.

12. A user equipment, comprising:
a transceiver unit configured to receive an instruction transmitted by a base station; and
a processing unit configured to determine an initial transmission carrier for transmitted semi-persistent scheduling data from the base station according to the instruction received by the transceiver unit, and instruct the receiving unit to receive the transmitted semi-persistent scheduling data from the base station through the initial transmission carrier, wherein:

the initial transmission carrier is determined by the base station according to channel condition information of each carrier in multiple carriers and a gain of a match of a multi-user multiple-input and multiple-output antenna unit, wherein the initial transmission carrier is determined by:

selecting a match of the multi-user multiple-input and multiple-output antenna unit according to a rank indicator, a precodinq matrix index, a channel quality indicator or channel state information that are of each carrier in the multiple carriers; and determining the initial transmission carrier according to a gain of the selected match of the multi-user multiple-input and multiple-output antenna unit, and the semi-persistent scheduling data initiates a subsequent transmission of uplink scheduling data by the UE through the instructed initial transmission carrier, wherein the instruction from the base station indicates that either:

a 1-bit indicator bit in a physical layer channel on each carrier in the multiple carriers is set, wherein the indicator bit instructs whether the semi-persistent scheduling data is scheduled on the carrier for transmission; or an indicator bit in a physical layer channel added on a selected downlink main carrier that has a predetermined length is set, wherein the indicator bit instructs the initial transmission carrier for transmitting the semi-persistent scheduling data.

13. The user equipment according to claim 12, wherein after the transceiver unit receives the semi-persistent scheduling data from the base station through the initial transmission carrier, the transceiver unit is further configured to:

return feedback information of the transmission of the semi-persistent scheduling data to the base station, wherein the feedback information indicates a correct reception or an incorrect reception requiring retransmission.

14. The user equipment according to claim 13, wherein if the feedback information of the transceiver unit indicates an incorrect reception requiring retransmission, the transceiver unit is further configured to:

receive the semi-persistent scheduling data retransmitted by the base station through the initial transmission carrier.

* * * * *